United States Patent
Tai et al.

(10) Patent No.: US 7,755,802 B2
(45) Date of Patent: Jul. 13, 2010

(54) TONER-BASED NOISE REDUCTION IN ELECTROSTATOGRAPHY

(75) Inventors: Hwai-Tzuu Tai, Rochester, NY (US); Yee S. Ng, Fairport, NY (US); Stephen E. Johnson, Pittsford, NY (US); Jennifer S. DeYoung, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 430 days.

(21) Appl. No.: 11/844,419

(22) Filed: Aug. 24, 2007

(65) Prior Publication Data

US 2009/0051979 A1 Feb. 26, 2009

(51) Int. Cl.
*H04N 1/58* (2006.01)
*H04N 1/50* (2006.01)
*H04N 1/29* (2006.01)

(52) U.S. Cl. .............. 358/3.24; 358/3.26; 358/501; 358/530; 358/300; 399/28; 399/29

(58) Field of Classification Search .............. 358/3.24, 358/3.26, 463, 300, 1.9, 501, 530; 399/14, 399/15, 27, 28, 29, 49, 53, 54, 9
See application file for complete search history.

(56) References Cited

U.S. PATENT DOCUMENTS

| | | | |
|---|---|---|---|
| 4,941,039 A | 7/1990 | E'Errico | |
| 5,081,692 A | 1/1992 | Kwon et al. | |
| 5,709,972 A | 1/1998 | Cookingham et al. | |
| 5,923,775 A | 7/1999 | Snyder et al. | |
| 6,175,374 B1 | 1/2001 | Broddin et al. | |
| 6,243,133 B1 | 6/2001 | Spaulding et al. | |
| 6,292,574 B1 | 9/2001 | Schildkraut et al. | |
| 6,538,677 B1 | 3/2003 | Thompson et al. | |
| 6,707,950 B1 | 3/2004 | Burns et al. | |
| 6,813,389 B1 | 11/2004 | Gindele et al. | |
| 6,819,452 B1 * | 11/2004 | Richtsmeier et al. ......... 358/1.9 |
| 6,823,089 B1 | 11/2004 | Yu et al. | |
| 6,895,103 B2 | 5/2005 | Chen et al. | |

(Continued)

FOREIGN PATENT DOCUMENTS

EP 1 014 207 6/2000

OTHER PUBLICATIONS

P. G. Engeldrum and K. Riehl, Jr., "Granularity-Density Relationship for Electrophotography Incorporating Paper and Toner Granularities", J.Opt. Soc. Am. A, vol. 3, No. 4, Apr. 1986, pp. 446-451.

(Continued)

*Primary Examiner*—Scott A. Rogers
(74) *Attorney, Agent, or Firm*—Robert L. Walker; William R. Zimmerli (57) ABSTRACT

In the method, a digital image is received. A granularity model is constructed of each of the toner stations. A noise table is produced. The noise table is based on the granularity models and is adaptive to the content of the digital image. Noise is reduced in the digital image using the noise table. The digital image is divided into a plurality of color records, each corresponding to a respective toner station. The color records of the noise reduced digital image are printed using respective toner stations. Each granularity model defines a toner applied by the respective toner station.

21 Claims, 7 Drawing Sheets

U.S. PATENT DOCUMENTS

| | | | |
|---|---|---|---|
| 6,907,144 | B1 | 6/2005 | Gindele |
| 6,931,160 | B2 | 8/2005 | Gindele et al. |
| 6,934,421 | B2 | 8/2005 | Gindele et al. |
| 7,065,255 | B2 | 6/2006 | Chen et al. |
| 7,092,554 | B2 | 8/2006 | Chen et al. |
| 7,307,754 | B2 * | 12/2007 | Motoyama et al. ........... 358/1.9 |
| 2003/0002744 | A1 | 1/2003 | Lopez-Estrada et al. |
| 2005/0157327 | A1 * | 7/2005 | Shoji et al. ..................... 399/9 |

OTHER PUBLICATIONS

J. S. Arney et al., "A Printer Model That is Independent of Halftone Algorithm (II): Modeling Noise Characteristics", Journal of Imaging Science and Technology, vol. 48, No. 5, Sep./Oct. 2004, pp. 426-431.

"Digital Image Smoothing and the Sigma Filter", by Jong-Sen Lee, Computer Vision, Graphics, and Image Processing, vol. 24, pp. 255-269, (1983), Academy Press, Inc.

U.S. Appl. No. 11/521,990, filed Sep. 15, 2006, entitled Image Control System and Method Incorporating a Grainless Correction, filed by Yee S. Ng, Chung-Hui Kuo, and Di Lai.

* cited by examiner

Figure 1:
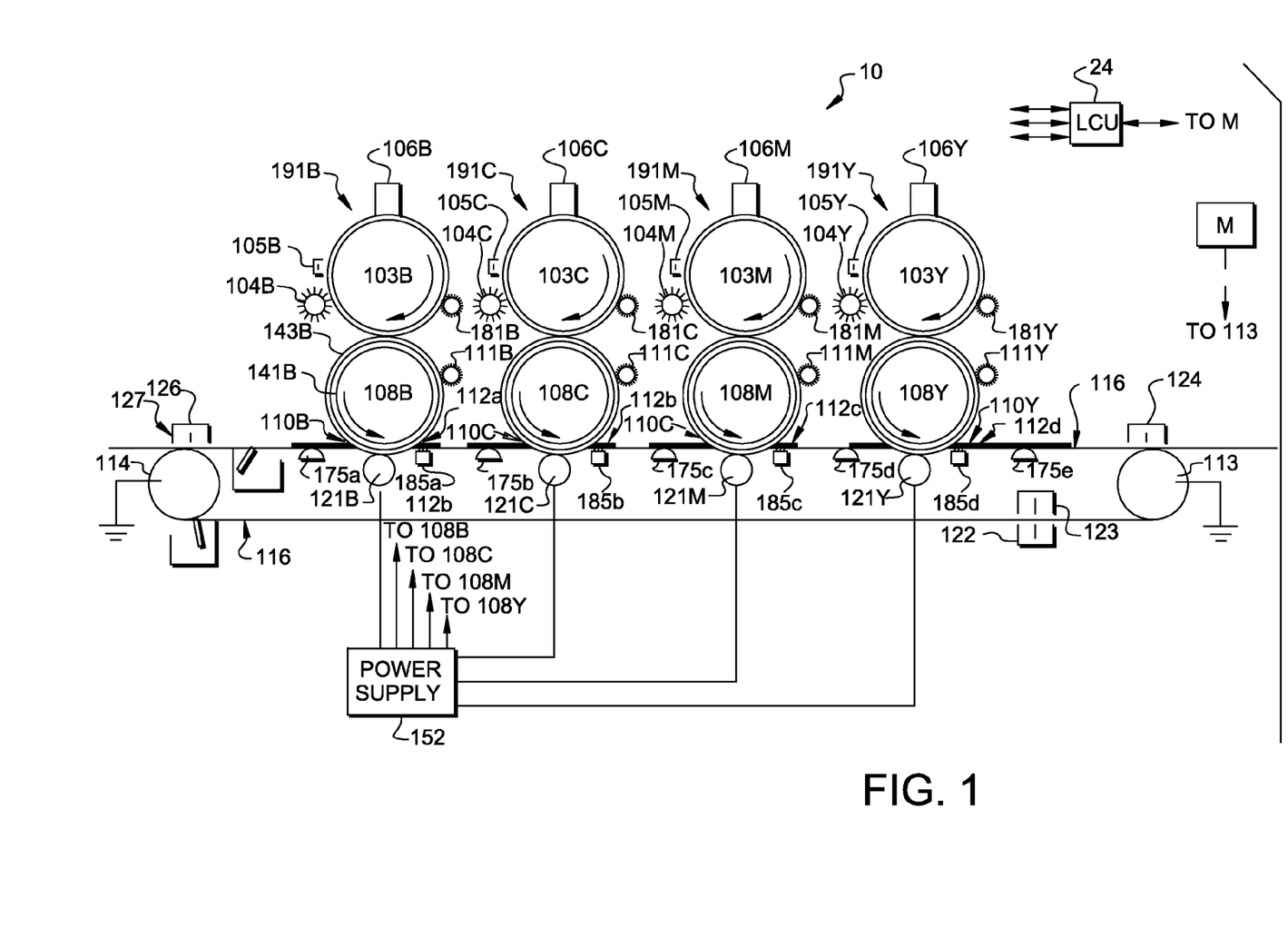
FIG. 1 is a semidiagrammatical view of the printer of an embodiment of the system.

FIG. 7 ated generally by the numeral 10. The system 10 includes an electrophotographic printer. Color separation images are formed in each of four color modules (191B, 191C, 191M, 191Y) and transferred in register to a substrate supported on a paper transport web (PTW) 116, as the PTW moves the substrate through the printer. More or less than four color modules can be utilized. For instance, the system can include a fifth color module or apparatus designated as F, thereby giving the print apparatus a CMYKF designation. The paper transport web 116 can be in the form of an endless belt. In a
TONER-BASED NOISE REDUCTION IN ELECTROSTATOGRAPHY

FIELD OF THE INVENTION

The invention relates to electrophotographic and other electrostatographic printing methods and systems and more particularly relates to electrostatographic methods and systems using toner-based noise reduction.

BACKGROUND OF THE INVENTION

Consumer photographs are often taken with inexpensive cameras and under less than ideal conditions. These shortcomings tend to result in a large percentage of printed images that are less than acceptable. Silver halide and thermal transfer printing systems are marketed by the Eastman Kodak Company of Rochester, N.Y., that include automatic image enhancement of photographic prints, known as Kodak Perfect Touch™, which includes noise reduction.

Noise characteristics are different in different types of printing systems. In electrostatographic systems, some of the noise characteristics relate to the use of toner, which is particulate that is fused to produce an image. It has been known that curves of granularity number vs. screen resolution (lines per inch, "lpi") are different with different toner particle sizes and with a uniform nominal toner particle size and different toner particle size distributions.

Noise reduction can be applied uniformly to all images, but this approach is inefficient, since some of the images may not benefit from noise reduction. In addition to allowing greater efficiency, variable noise reduction can produce better results. The application of a noise filter on an image often has an unintended consequence of reducing desirable image detail. Methods for designing and using Sigma filters are disclosed in U.S. Pat. No. 6,907,144 that attempt to minimize the loss of image detail while reducing the random noise present in a digital image. U.S. Pat. No. 5,923,775 to Snyder et al. discloses varying noise reduction based on characteristics of an image. U.S. Pat. No. 6,934,421 to Gindele et al. discloses varying noise reduction in accordance with the characteristics of a particular input source. U.S. Pat. No. 6,931,160 teaches use of a noise table in noise reduction. U.S. Pat. No. 7,065,255 to Chen et al. discloses method and apparatus, in which noise in digital images is reduced using a noise table that is selected based on metadata associated with the respective images.

It would thus be desirable to provide methods and systems, in which variable noise reduction is applied to electrostatographic printing of images.

SUMMARY OF THE INVENTION

The invention is defined by the claims. The invention, in broader aspects, provides printing systems and printing methods for use with a printer having a plurality of toner stations. In the method, a digital image is received. A granularity model is constructed of each of the toner stations. A noise table is produced. The noise table is based on the granularity models and is adaptive to the content of the digital image. Noise is reduced in the digital image using the noise table. The digital image is divided into a plurality of color records, each corresponding to a respective toner station. The color records of the noise reduced digital image are printed using respective toner stations. Each granularity model defines a toner applied by the respective toner station.

It is an advantageous effect of the invention that improved methods and systems are provided, in which noise reduction is based on granularity models that define respective toners.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

The method uses and the system includes a printer having a plurality of toner stations, which apply respective toners to a substrate. Electrostatographic printing with toners results in sharpening of edges in printed images relative to the digital content or the same digital image printed by another printing technique, such as silver halide printing or thermal transfer printing. There are also differences in noise relative to the digital content or to silver halide/thermal transfer prints. The differences depend upon sets of parameter values, referred to herein as the "granularity models", of each of the toner stations of a printer used to produce a print. The granularity models each define a respective toner and differ from toner to toner. The method and system use respective granularity models to generate a noise table adaptive to the content of a digital image. The noise table is then used to reduce noise in the digital image, which is then printed.

In the method, a granularity model is constructed for each toner station of a printer. Each granularity model defines a respective toner. A noise table is produced based on the granularity models and noise is reduced in a received digital image using the noise table. The digital image is divided into a plurality of color records and the color records are printed using respective toner stations. The granularity model indicates parameter values of a particular toner and is associated with a set of noise characteristics that indicate how that particular toner influences the visibility of the printed image noise. In comparison to uniform or less sophisticated noise reduction, the noise table produced from the granularity models allows noise reduction to be just aggressive enough to minimize the visibility of the printed digital image noise while minimizing the loss of image detail due to the noise filtering process.

FIG. 1 illustrates an image forming reproduction system according to an embodiment of the invention and is designated generally by the numeral 10. The system 10 includes an electrophotographic printer. Color separation images are formed in each of four color modules (191B, 191C, 191M, 191Y) and transferred in register to a substrate supported on a paper transport web (PTW) 116, as the PTW moves the substrate through the printer. More or less than four color modules can be utilized. For instance, the system can include a fifth color module or apparatus designated as F, thereby giving the print apparatus a CMYKF designation. The paper transport web 116 can be in the form of an endless belt. In a particular embodiment, the PTW 116 mechanically drives all the modules, in addition to transporting the substrate from module to module.

The elements in FIG. 1 that are similar from module to module have similar reference numerals with a suffix of B, C, M and Y referring to the color module to which it is associated, i.e., black, cyan, magenta and yellow, respectively. Four substrates or sheets 112*a, b, c* and *d* are shown simultaneously receiving toner images from the different modules. For convenience, substrates are discussed herein as if each substrate received a toner image from each module. In use, image content determines toner deposition.

The movement of the substrate with the PTW 116 is such that each color image transferred to the substrate at the transfer nip of each module is a transfer that is registered with the previous color transfer so that a four-color image formed on the substrate has the colors in registered superposed relationship on the substrate. The substrates are then serially detacked from the PTW and sent to a fusing station (not shown) to fuse or fix the dry toner images to the substrate. The PTW is reconditioned for reuse by providing charge to both surfaces using, for example, opposed corona chargers 122, 123 which neutralize charge on the two surfaces of the PTW.

Each color module includes a primary image-forming member (PIFM), for example a rotating drum 103B, C, M and Y, respectively. The drums rotate in the directions shown by the arrows and about their respective axes. Each PIFM 103B, C, M and Y has a photoconductive surface, upon which a toner image is formed. In order to form images, the outer surface of the PIFM is uniformly charged by a primary charger such as a corona charging device 105 B, C, M and Y, respectively or other suitable charger such as roller chargers, brush chargers, etc. The uniformly charged surface is exposed by suitable exposure means, such as for example a laser 106 B, C, M and Y, respectively or more preferably an LED or other electro-optical exposure device or even an optical exposure device to selectively alter the charge on the surface of the PIFM to create an electrostatic latent image corresponding to an image to be reproduced.

The electrostatic image is developed by application of charged marking particles to the latent image bearing photoconductive drum by a development station 181 B, C, M and Y, respectively. The development station holds a particular color of toner, that is, pigmented toner marking particles. Thus, each module creates a series of different color toner images on the respective photoconductive drum. (This usage of "color" is inclusive of other differences in toner, such as transparent toner, MICR toner, and the like.) A photoconductive belt can be used in lieu of a photoconductive drum.

Each toner image formed on a respective PIFM is transferred electrostatically to an outer surface of a respective secondary or intermediate image transfer member (ITM), for example, an intermediate transfer drum 108 B, C, M and Y, respectively. The PIFMs are each caused to rotate about their respective axes by frictional engagement with a respective ITM. The arrows in the ITMs indicate the directions of rotations. After transfer, the toner image is cleaned from the surface of the photoconductive drum by a suitable cleaning device 104 B, C, M, and Y, respectively to prepare the surface for reuse for forming subsequent toner images. The intermediate transfer drum or ITM preferably includes a metallic (such as aluminum) conductive core 141 B, C, M and Y, respectively and a compliant blanket layer 143 B, C, M and Y, respectively. The cores 141 C, M and Y and the blanket layers 143 C, M and Y are shown in FIG. 1, and correspond to similar structure shown and box not identified for module 191 B. The compliant layer is formed of an elastomer such as polyurethane or other materials well noted in the published literature. The elastomer is doped with sufficient conductive material (such as antistatic particles, ionic conducting materials, or electrically conducting dopants) to have a relatively low resistivity. With such a relatively conductive intermediate image transfer member drum, transfer of the single color toner images to the surface of the ITM can be accomplished with a relatively narrow nip width and a relatively modest potential of suitable polarity applied by a constant voltage potential source (not shown). Different levels of constant voltage can be provided to the different ITMs so that the constant voltage on one ITM differs from that of another ITM in the apparatus.

A single color toner image respectively formed on the surface of each intermediate image transfer member drum, is transferred to a toner image receiving surface of a substrate, which is fed into a nip between the intermediate image transfer member drum and a transfer backing roller (TBR) 121B, C, M and Y, respectively, that is suitably electrically biased by a constant current power supply 152 to induce the charged toner particle image to electrostatically transfer to a receiver sheet. Each TBR is provided with a respective constant current by power supply 152. The transfer backing roller or TBR preferably includes a metallic (such as aluminum) conductive core and a compliant blanket layer. Although a resistive blanket is preferred, the TBR can be a conductive roller made of aluminum or other metal. The substrate is fed from a suitable substrate supply (not shown) and is suitably "tacked" to the PTW 116 and moves serially into each of the nips 110B, C, M and Y where it receives the respective toner image in suitable registered relationship to form a composite multicolor image. As is well known, the colored pigments can overlie one another to form areas of colors different from that of the pigments. The substrate exits the last nip and is transported by a suitable transport mechanism (not shown) to a fuser where the toner image is fixed to the substrate by application of heat and/or pressure and, preferably both. A detack charger 124 may be provided to deposit a neutralizing charge on the substrate to facilitate separation of the substrate from the PTW 116. The substrate with the fixed toner image is then transported to a: remote location for operator retrieval. The respective ITMs are each cleaned by a respective cleaning device 111B, C, M and Y to prepare it for reuse. In the embodiments shown, the ITM's are drums. Belts can also be used and a single ITM can be shared between multiple ITM's.

Appropriate sensors (175*a, b, c, d, e*; 185*a, b, c, d*) such as mechanical, electrical, or optical sensors described hereinbefore are utilized in the reproduction apparatus 10 to provide control signals for the apparatus. Such sensors are located along the substrate travel path, which extends between the substrate supply through the various nips to the fuser. Further sensors may be associated with the primary image forming member photoconductive drum, the intermediate image transfer member drum, the transfer backing member, and various image processing stations. As such, the sensors detect the location of a substrate in its travel path, and the position of the primary image forming member photoconductive drum in relation to the image forming processing stations, and respectively produce appropriate signals indicative thereof. Such signals are fed as input information to a logic and control unit (LCU), which includes a microprocessor. Based on such signals and suitable programming, the LCU produces signals to control the timing operation of the various electrostatographic process stations for carrying out the reproduction process and to control drive by motor M of the various drums and belts. The production of a program for a number of commercially available microprocessors, which are suitable for use with the invention, is a conventional skill well understood in the art. The particular details of any such program depends upon the architecture of the designated microprocessor.

The substrates utilized with the reproduction apparatus 10 can vary substantially. For example, a substrate can be thin or thick paper stock (coated or uncoated) or transparency stock. As the thickness and/or resistivity of the substrate stock varies, the resulting change in impedance affects the electric field used in the nips 110B, C, M, Y to urge transfer of the marking particles to the substrates.

A variation in relative humidity will vary the conductivity of a paper substrate, which also affects the impedance and hence changes the transfer field. To overcome these problems, the paper transport belt can have certain characteristics. The PTW 116 can be an endless belt or web having a top layer of a material having a bulk electrical resistivity. A support layer of the PTW 116 can have the same composition and be continuous with the top layer or can be different. The web material can be of any of a variety of flexible materials such as a fluorinated copolymer (such as polyvinylidene fluoride), polycarbonate, polyurethane, polyethylene terephthalate, polyimides (such as Kapton®), polyethylene napthoate, or silicone rubber. An additive can be used, such as an anti-stat (e.g. metal salts) or small conductive particles (e.g. carbon), to impart the desired resistivity. When materials with high resistivity are used, additional corona charger(s) may be needed to discharge any residual charge remaining on the web once the substrate has been removed. The belt can have a conducting layer beneath the resistive layer, which is electrically biased to urge toner image transfer. The conducting layer can be the support layer or an additional layer. Alternatively, the conducting layer is absent and the transfer bias is applied through either one or more of the support rollers or with a corona charger.

As another alternative, substrate sheets and the web can be replaced by a continuous substrate web. Such continuous webs can be supplied from a roll of paper that is supported to allow unwinding of the paper from the roll as the paper passes as a generally continuous sheet through the apparatus.

In feeding a substrate onto PTW 116, charge can be provided on the substrate by charger 126 to electrostatically attract the substrate and "tack" it to the PTW 116. A blade 127 associated with the charger 126 can be provided to press the substrate onto the belt and remove any air entrained between the substrate and the belt.

The PTW 116 is entrained about a plurality of support members. For example, as shown in FIG. 1, the plurality of support members are rollers 113, 114 with preferably roller 113 being driven as shown by motor M (not shown) to drive the PTW (of course, other support members such as skis or bars would be suitable for use with this invention). The driven PTW can frictionally drive the ITMs to rotate the ITMs, which in turn causes the PIFMs to be rotated, or additional drives can be provided. The process speed is determined by the velocity of the PTW.

Alternatively, direct transfer of each image can be made directly from respective photoconductive drums to the receiver sheet as the receiver sheet serially advances through the transfer stations while supported by the paper transport web without ITMs. The respective toned color separation images are transferred in registered relationship to a substrate as the substrate serially travels or advances from module to module receiving in transfer at each transfer nip a respective toner color separation image.

Figure 2:
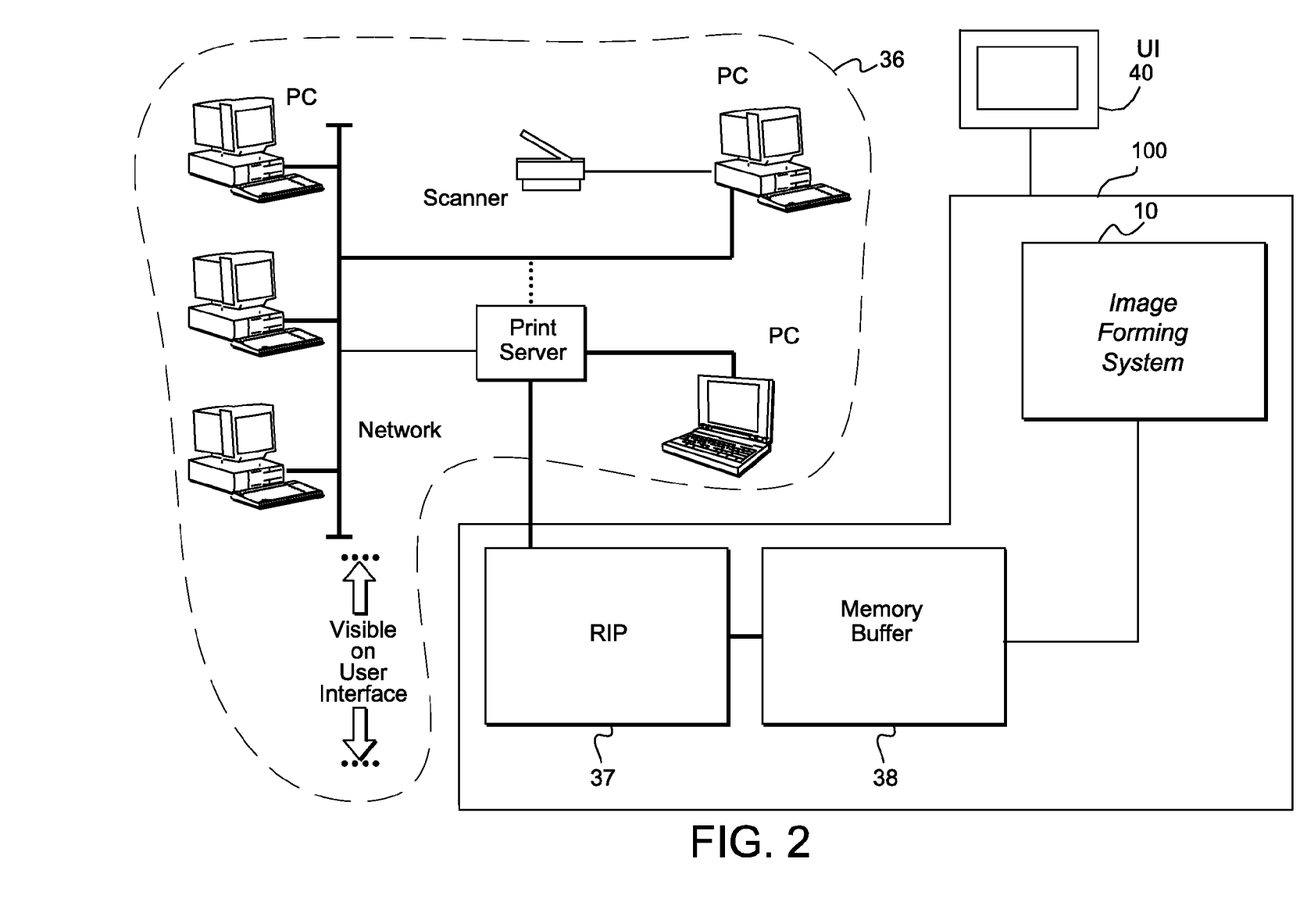
FIG. 2 is a diagrammatical view of the system of FIG. 1.

Referring to FIG. 2, image data to be printed is provided by an image data source 36, which is a device that can provide digital data defining a version of the image. Such types of devices are numerous and include computer or microcontroller, computer workstation, scanner, digital camera, etc. Multiple devices can be interconnected via one or more networks. These image data sources are at the front end and can include an application program that is used to create or find an image to output. The application program sends the image to a device driver, which serves as an interface between the client and the marking device. The device driver then encodes the image in a format that serves to describe what image is to be generated on a page. For instance, a suitable format is page description language ("PDL"). The device driver sends the encoded image to the marking device. This data represents the location, color, and intensity of each pixel that is exposed. Signals from data source 36, in combination with control signals from LCU 24 are provided to a controller, which can include a raster image processor (RIP) 37 for rasterization. LCU 24, RIP 37, and Image Forming System 10 can all be provided in a front end unit 100, having a local user interface 40 (UI) for operating the system from close proximity.

In general, the major roles of the RIP 37 are to: receive job information from the server; parse the header from the print job and determine the printing and finishing requirements of the job; analyze the PDL (page description language) to reflect any job or page requirements that were not stated in the header; resolve any conflicts between the requirements of the job and the marking engine configuration (i.e., RIP time mismatch resolution); keep accounting record and error logs and provide this information to any subsystem, upon request; communicate image transfer requirements to the marking engine; translate the data from PDL (page description language) to raster for printing; and support diagnostics communication between user applications. The RIP accepts a print job in the form of a page description language (PDL) such as postscript, PDF or PCL and converts it into raster, or grid of lines or form that the marking engine can accept. The PDL file received at the RIP describes the layout of the document as it was created on the host computer used by the customer. This conversion process is also called rasterization as well as ripping. The RIP makes the decision on how to process the document based on what PDL the document is described in, by looking at the beginning data of the document, or document header.

Raster image processing or ripping begins with a page description generated by the computer application used to produce the desired image. The raster image processor interprets this page description into a display list of objects. This display list contains a descriptor for each text and non-text object to be printed; in the case of text, the descriptor specifies each text character, its font, and its location on the page. Multi-bit images, alternatively, are represented by a digital array of pixels, wherein the pixels have assigned values of more than two number possibilities. The RIP renders the display list into a "contone" (continuous tone) byte map for the page to be printed. This contone byte map represents each pixel location on the page to be printed by a density level (typically eight bits, or one byte, for a byte map rendering) for each color to be printed. Black text is generally represented by a full density value (255, for an eight bit rendering) for each pixel within the character. Finally, the half-tone processor renders the byte map into a bit map for use by the printer. The term "half-toning" and like terms are inclusive of use of digital screens having uniform frequencies and other half-toning procedures, including stochastic screens and any other dot patterns. Half-tone densities can be formed by the application of a half-tone screen to the byte map, especially in the case of image objects to be printed. Pre-press adjustments can include the selection of the particular half-tone screens to be applied, for example to adjust the contrast of the resulting image. Gray scale printing can be provided by the half-toning algorithm, as described in U.S. Pat. No. 6,538,677. In this case, the half-toning algorithm groups adjacent pixels into sets of adjacent cells, each cell corresponding to a half-tone dot of the image to be printed. The gray tones are printed by increasing the level of exposure of each pixel in the cell, by increasing the duration by way of which a corresponding LED in the printhead is kept on, and by "growing" the exposure into adjacent pixels within the cell.

Once the document has been ripped, the raster data goes to a page buffer memory (PBM) 38 or cache via a data bus. The PBM eventually sends the ripped print job information to the marking engine 10. The PBM accepts digital image input and stores it for a limited time so it can be retrieved and printed to complete the job as needed. The amount of memory required to store a given number of images can be reduced by compressing the images; therefore, the images can be compressed prior to memory storage, then decompressed while being read from memory.

Image processing in accordance with the method can be performed in the RIP or elsewhere in the system. In a particular embodiment, printable frames are received in PDF format and digital images and associated metadata, are extracted. Image processing, including noise reduction, is then performed on the extracted images, which are then recomposed into PDF format printable frames, which are then printed.

In the method, noise can be quantified in terms of either graininess or granularity. Noise can be described as an observer perceived variation in density resulting from application of an otherwise uniform imaging process. With either graininess or granularity, the density variations can be measured using a microdensitometer. Granularity, which is a measure of the variation in density of an otherwise uniform area, is the root mean square (rms) value or standard deviation. Graininess is measured in the same manner as granularity, but, unlike granularity, includes a visual weighting function based on visual sensitivity to grain based color.

A grain ruler can be used as a tool to evaluate granularity in printed images. U.S. Pat. No. 5,709,972 to Cookingham et al. discloses a generalized grain ruler that incorporates a plurality of uniform patches representing a range of granularities. Each patch is a perceptually distinct representation of graininess spaced at perceptually uniform intervals and a sequence of different levels of graininess. U.S. Publication No. 2008/0068625, entitled *Image Control System and Method Incorporating a Graininess Correction*, filed by Yee S. Ng, Chung-Hui Kuo, and Di Lai, which is hereby incorporated herein by reference, discloses methods and systems, in which a graininess metric is determined for a region of interest (ROI) of an image.

In defining a toner, a granularity model specifies one or more toner parameters including: toner particle size, toner particle shape, and toner colorant strength. Different toner stations in the system can have the same or different toner particle sizes. Toner particle sizes are considered to be the same for a particular system when any difference in modulation transfer function (MTF) between the images produced under conditions differing only in toner particle size are imperceptible or are within a predetermined acceptable range. The term "toner particle size", as used herein, refers to a toner particle size distribution. For convenience, toners having a single peak particle size and a relatively narrow distribution of particular sizes are referred to by the nominal particle size corresponding to the peak. It will be understood that this is a simplification. Two donors can have different "toner particle sizes", with the same peak toner particle size, if the toner particle size distributions are different. Different toner stations can have toners with the same or different particle shapes. (As with particle size, "particle shape" refers to a distribution of particle shapes.) Particle shape has an affect on image smoothness and, thus, directly affects noise characteristics. Different toner stations can also have toners with the same or different colorant strengths. The term "colorant strength" refers to differences in perceived color density and differs from calorimetric intensity by inclusion of the visual response function. Additional toner parameters can also be included in the granularity model. For example, the relative order of particular toner stations in the system or other characteristics of the toner stations that affect production of the respective toner images. If not all of the toner parameters are defined or otherwise available, defaults can be used for one or more of the parameters. Suitable defaults can be determined heuristically.

Figure 3:
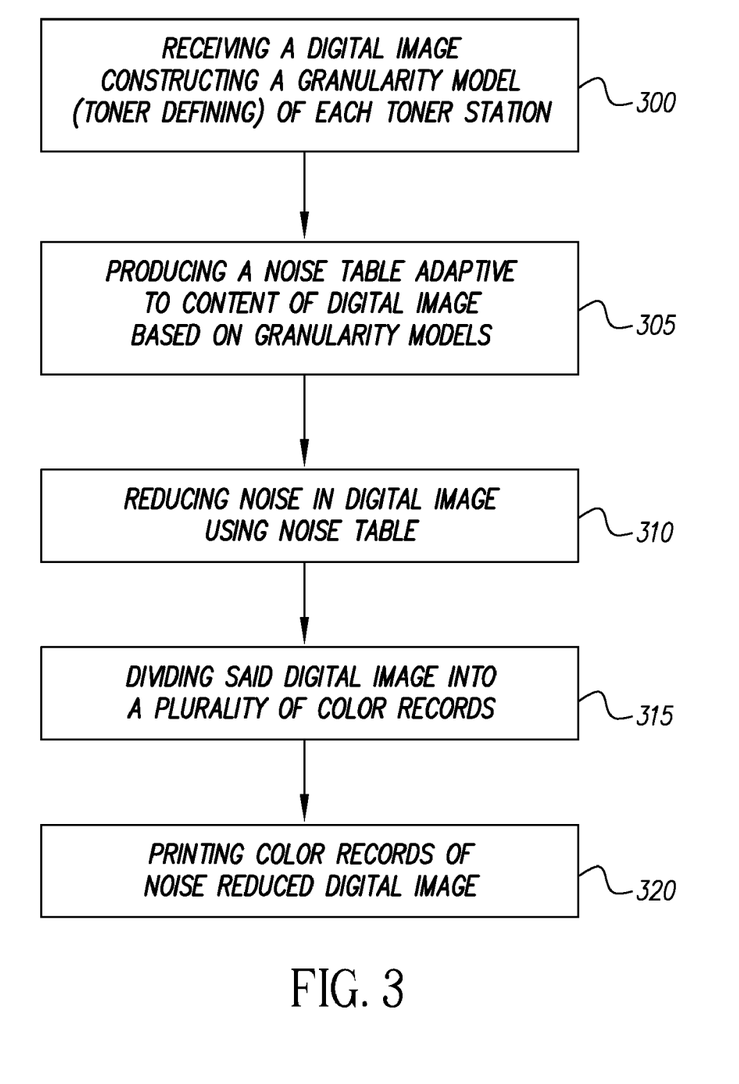
FIG. 3 is a flow chart of an embodiment of the method.

The granularity model of each toner station is constructed by determining values of applicable toner parameters of the toner held by that toner station(Step 300 shown in FIG. 3). These values can be ascertained off-line for a particular toner and toner station and can be input manually or automatically when toner or a replacement toner station is loaded into the system. The front end unit determines the toner parameter values for a particular print job from the stored values for the respective toner stations. In a particular embodiment, toner parameter values for particular toners are stored in the system and are determined by ascertaining an identification of the respective toner and then looking up the corresponding toner parameter values. The toner identification can be supplied manually or automatically, for example, by reading a barcode associated with a supply of the toner.

The noise table is then generated from the granularity models of each of the toner stations(Step 305). Different combinations of parameter values each have an associated set of noise characteristics. The noise characteristics take into account the noise differences due to the toner characteristics, in addition to the differential response of the human eye to noise at different frequencies. Respective noise characteristics for all of the toner stations used in a system to produce a particular document are combined in the applicable noise table for that document.

Figure 4:
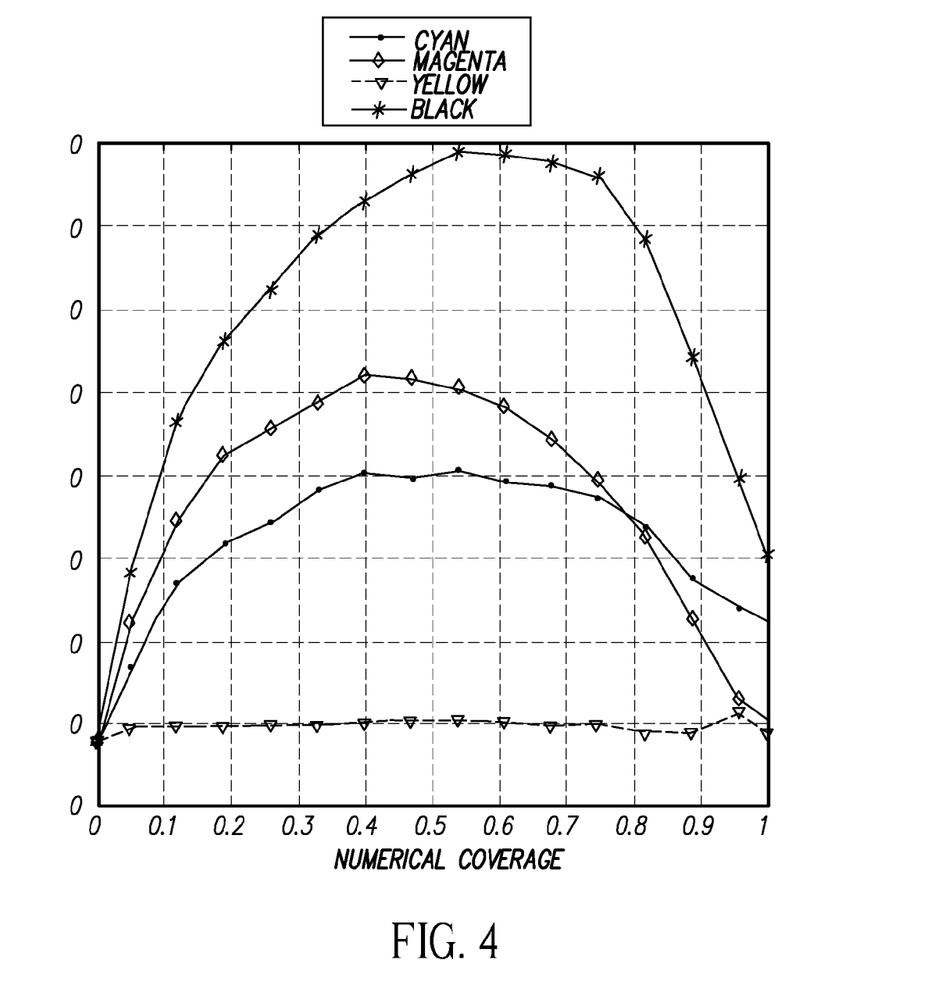
FIGS. 4-7 are graphs showing data used in portions of a system model usable with the embodiments of FIGS. 1 and 3. "Measured Color Graininess", "Color Visual Grain", and "Color Grain" all refer to the same units of "graininess", as defined herein. "Numerical Coverage" is a decimal unit corresponding to a percentage, in which 1.0=100 percent.
Figure 5:
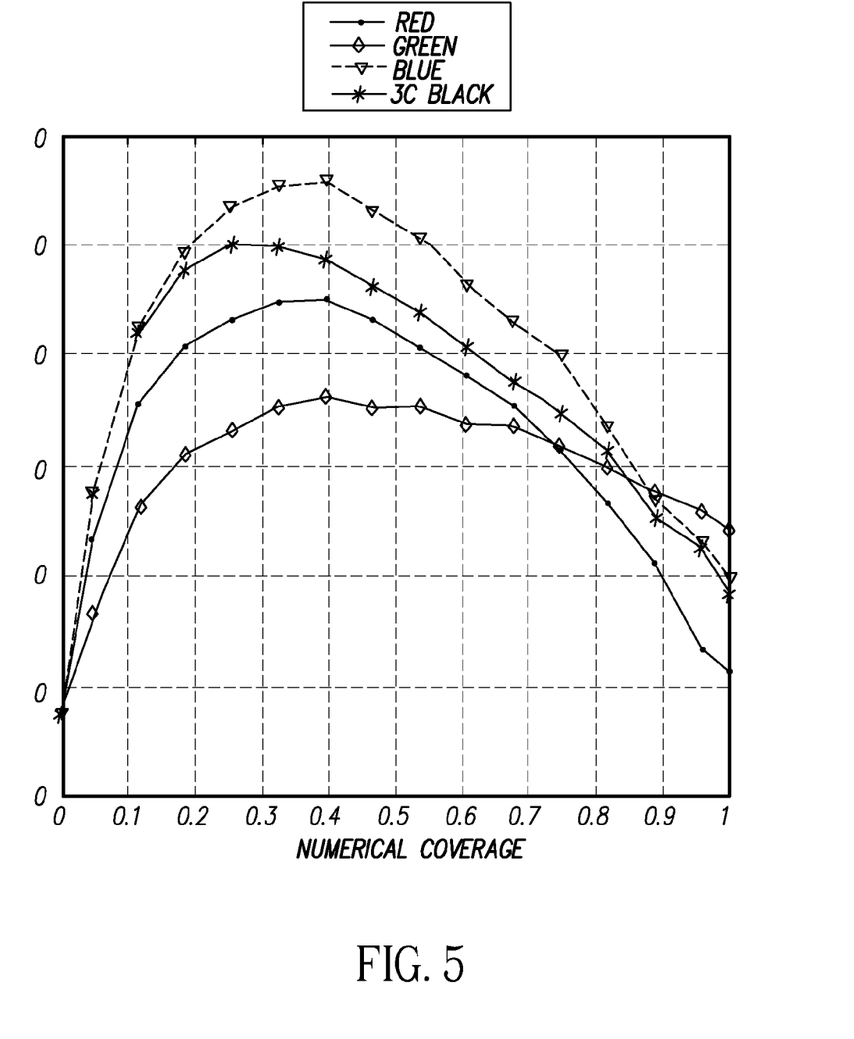
Figure 6:
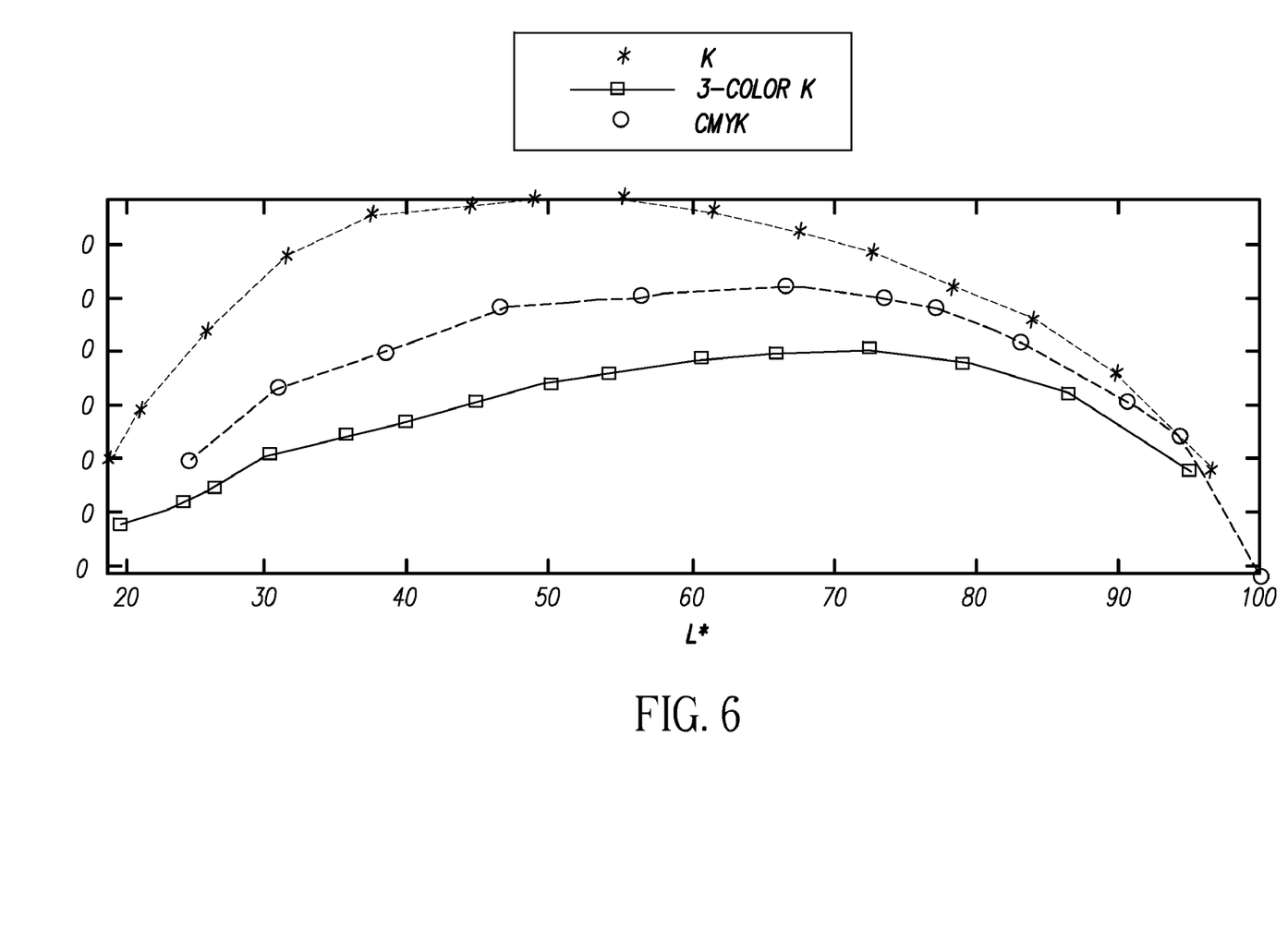
Figure 7:
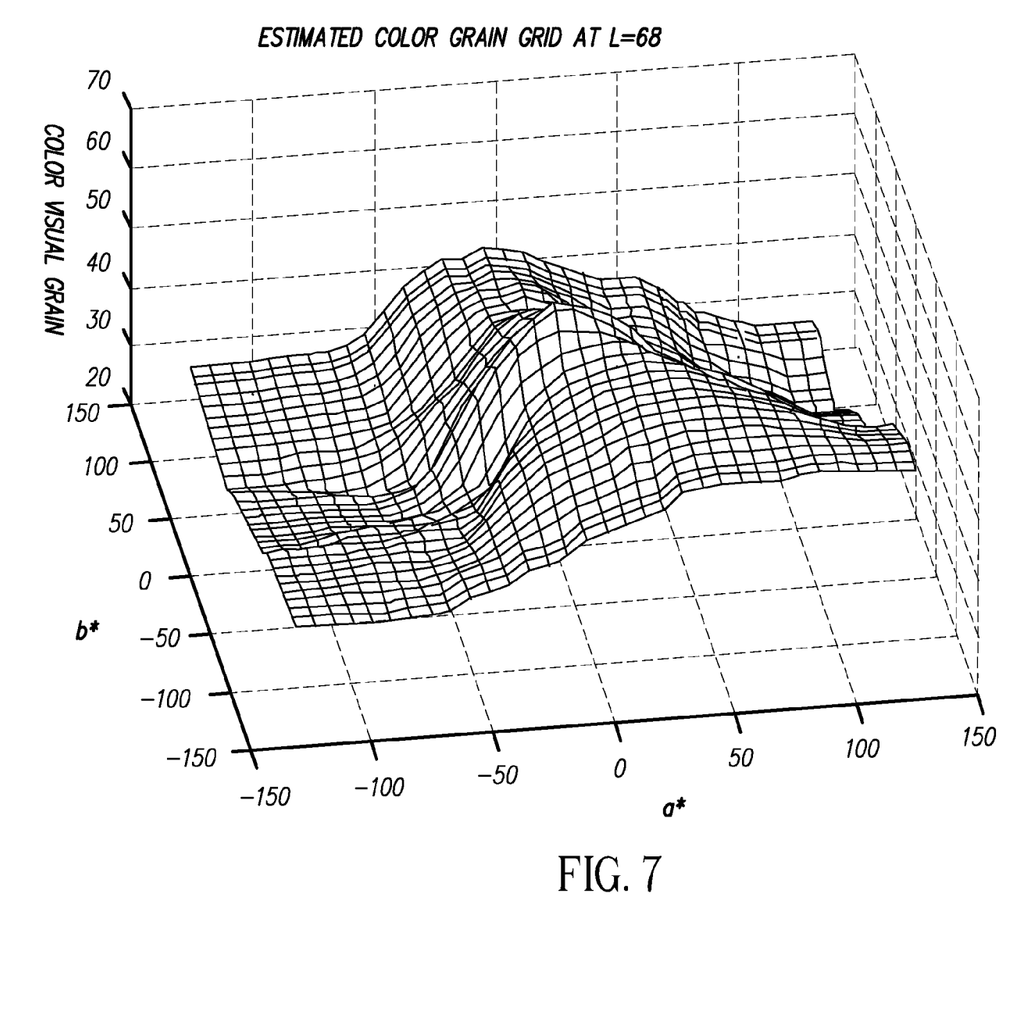

Specific examples of some of the noise (granularity) characteristics of various granularity models are shown in FIGS. 4-7. The CMYK toners had an 8 μm particle size (single peak particle size distribution and irregular toner particle shape) and were printed with a Kodak NexPress 2500 electrophotographic press, made by Eastman Kodak Company of Rochester, N.Y., using a 150 lpi screen. The toner stations were arranged in the sequential laydown order: KYMC. Uniform patches of different percentages of full coverage were printed and scanned. The granularity number of each patch was then calculated. The final standard deviation values were tabulated as a function of the average pixel value. Some of the granularity characteristics of such granularity models are graphed in FIGS. 4-7. FIG. 4 shows curves of graininess vs. coverage for each of the toners used. The curves differ and the toners have different peaks. FIG. 5 is a graph of red, blue, and green patches printed using the toners of FIG. 4. The curves differ from each other and from the curves of FIG. 4. In FIG. 5, the granularity has peaks near the quarter-tone area. (A noise table for an input image having color values like those shown in FIG. 5 would have higher standard deviation values in the quarter-tone area than in other tone areas.) FIG. 6 is a graph of graininess at different L* values for three different blacks: single K toner, three color toners, and CMYK toners. The curves indicate that colorant strengths of the toners differ and have different peaks. FIG. 7, similarly, shows graininess at L*=68 for different values of a* and b*. L*, a*, and b* values are as defined by the CIELAB color space.

The noise characteristics can be stored in the system along with the corresponding parameter values. In a particular embodiment, the noise characteristics corresponding to particular combinations of parameter values are determined by selecting an applicable portion of a predetermined system model that includes noise characteristics for all possible combinations.

The noise table for a particular input digital image combines the noise characteristics of the different toners used to produce a document adaptive to the content of the digital image. The combination can be simple or complex, as desired for a particular use. For example, the noise table used for the digital image can be based upon the noise characteristics of a predominant toner color in the output document. This approach might be used in a situation, in which one or more of the toners used has much worse noise characteristics than the remaining toners. In a particular embodiment, the noise table is multi-dimensional, with each dimension corresponding to a respective toner station. The characteristics along each dimension are adaptive to that portion of the content of the digital image, which will be printed by the respective toner.

The multi-dimensionality allows adaptation to interactive effects of the combination of toner images of the printed document. For example, although the black toner has optical absorption across the entire visible spectrum, it has largest interactions with other toners such as yellow, cyan, and magenta toners. Similarly, yellow, cyan, and magenta toners each have unique light absorption characteristics and also interact with each other. Furthermore, heat fusing during the printing process exposes the top layer of toner to more heat than the bottom layer of toner. This effect tends to result in differential flow of toner depending upon relative position in the toner stack, with the top layer of toner flowing more than the bottom layer of toner. The individual toners can be changed to change this effect and the order of the toners in the toner stack can also be changed by changing the order of the toner stations in the printer. Toners having granularity characteristics that are well suited to a multi-dimensional noise table are illustrated in FIGS. 4-7.

The system model or requisite sets of input noise characteristics can be generated by repeatedly printing a test target chart that includes a series of flat patch targets having different reflectance values, then analyzing the captured digital image statistics. The resulting test target digital image will have several regions of nearly uniform density areas, or uniform patches, depending on the number of flat patch targets in the test target chart. The test target can correspond, for example, to an ISO 12640 IT8.7/3 target, which provides defined colors in the CIELAB color space. The test target digital image is printed using each of the different toners and toner stations having values of toner parameters corresponding to the granularity models available to the system and, preferably, corresponding to the available combinations of those granularity models. The average pixel value and the standard deviation of the pixel values for each color of pixels corresponding to each flat patch target is measured with a statistical analysis computer tool. The standard deviation value and average pixel value relationship is a characteristic relationship of the noise magnitude representative of the particular granularity model or combination of granularity models. The standard deviation values are tabulated as a function of the average pixel value to provide the noise table.

For each flat patch target, the standard deviation value is derived directly from a cropped portion of a flat patch target using approximately several hundred or thousand of pixel values. Improved results are obtained by taking precautions to prevent some types of structure contamination, or noise characteristics not related to the particular system parameters. For example, sometimes pixel values can be far away from the average of the flat patch target. Such bad pixel values can be detected by the magnitude pixel difference from the average being unusually large. A cut-off pixel difference threshold as a multiple of the standard deviation is defined. Pixel values larger than this cut-off pixel difference threshold from the average are discarded. The standard deviation value is then calculated a second time with the pixel values that have not been discarded. One way to reduce low frequency components due to system issues unrelated to a particular granularity model is by collecting statistics of smaller regions within the pixel regions corresponding to the flat patch targets. For example, a 5 by 5 window of pixels can be used to calculate a local pixel average. This local pixel average is then subtracted from the pixel values. Next, the local standard deviation of the window of pixels is calculated. This calculation is performed as a sliding window, which produces unique local standard deviation values corresponding to each pixel location. The collection of local standard deviation values of all 5 by 5 regions corresponding to the flat patch target is analyzed and the median of this collection of standard deviation values is used as the representative standard deviation value for the noise table value. The median of standard deviation values better relates to the high frequency noise. The window size can be chosen to calculate noise standard deviation values that relate to different spatial frequency ranges.

Those skilled in the art will appreciate that other measures of noise magnitude can be used, such as but not limited to the half-width or 95 percent width of the noise distribution. The system model can also use more complicated measures of noise magnitude that relate to a noise source of a non-Gaussian distribution.

In generating and using the noise table, applicable color spaces have to be considered. It is convenient that the noise table be in the same color space as the digital image when the noise table is used. In a particular embodiment, the digital image is converted from an RGB signal to an intermediary color space and noise reduction is applied in that intermediary color space. The mathematical operations required to transform R, G, and B image-bearing signals to the intermediary can consist of a sequence of matrix operations and 1-dimensional LUTs (look-up tables). Three 1-dimensional tables, corresponding to the three dimensions of a 3-dimensional LUT, are typically provided for the three input colors. The 3-dimensional LUT can be developed as disclosed in U.S. Pat. No. 4,941,039 to D'Errico. Such transformations can also be accomplished by employing a single mathematical operation or a combination of mathematical operations in the computational steps including, but not limited to, matrix algebra, algebraic expressions dependent on one or more of the image-bearing signals, and n-dimensional LUTs.

The complexity of the system model can be varied to meet particular needs. For example, some features may never be used with a particular system and can be ignored. Similarly, the system model can be enlarged to meet particular circumstances. For example, the noise reduction can be applied to the digital image in an input color space of the digital image. In that case, the system model can include combinations for all possible input color spaces.

The noise table is used as an indication of the expected magnitude of noise present in the source digital image. In a particular embodiment, the noise table is a table of standard deviation values as a function of the pixel color and pixel value to characterize the expected noise magnitude associated with the source digital image. The noise present in the source digital image is approximated as having a Gaussian distribution with a magnitude which is color (pixel color) and intensity (pixel value) dependent. As such, a Gaussian distribution can be characterized by a single parameter value—a standard deviation. The values of the noise table are representative of the expected noise magnitude for a digital image. The noise table need not have an entry for each possible pixel value. The nearest table entry value to the pixel value being processed can be used for other pixel values or unlisted values can be interpolated.

The noise table is used in conjunction with spatial filters to produce an enhanced digital image from the source digital image(Step 310). A spatial filter is any method, which uses pixel values sampled from a local region about a pixel of interest to calculate an enhanced pixel value that replaces the pixel of interest. Noise reduction filters can be considered those spatial filters that reduce spatial modulation for at least some pixels, in an effort to remove noise from the processed digital image. Spatial sharpening filters can be considered those spatial filters that increase spatial modulation for at least some pixels, in an effort to reduce spatial detail signal in the processed digital image. It should be noted that it is possible for a single spatial filter to be considered both a noise reduction filter as well as a spatial sharpening filter. The present invention can be used with any digital image processing method, which makes uses of a noise table to produce an enhanced digital image. The standard deviation values contained in the noise table can be used as a noise processing parameter to control a spatial filter. In a particular embodiment, a noise reduction filter and a spatial sharpening filter are controlled. Both the spatial filters are non-linear spatial filters, i.e. the effect on a processed pixel is not a simple linear weighting of the surrounding pixel values. Those skilled in the art will recognize that other calculated or stored quantities can serve as a noise processing parameter.

The noise table is received by one or more digital image processing modules, which use the noise table to process the pixel data of the source digital image. A particular embodiment has a noise reduction module and a spatial sharpening module. The noise reduction module receives the noise table and enhances the spatial detail in the source digital image by removing noise from the source digital image through the application of a non-linear spatial filtering operation. Similarly, the spatial sharpening module receives the noise table and uses it to enhance the spatial detail of the processed digital image from the noise reduction module through the use of a different non-linear spatial filter that amplifies the image signal without amplifying the noise. Those skilled in the art will appreciate that the present invention is not limited to the described forms of digital image processing modules.

According to one embodiment of the present invention a modified implementation of the Sigma filter, described by Jong-Sen Lee in the journal article Digital Image Smoothing and the Sigma Filter, *Computer Vision, Graphics, and Image Processing*, Vol. 24, p. 255-269, 1983, is used as a noise reduction filter to enhance the appearance of the processed digital image. The values of the pixels contained in a sampled local region, n by n pixels where n denotes the length of pixels in either the row or column direction, are compared with the value of the center pixel, or pixel of interest. Each pixel in the sampled local region is given a weighting factor of one or zero based on the absolute difference between the value of the pixel of interest and the local region pixel value. If the absolute value of the pixel value difference is less or equal to a threshold $\epsilon$, the weighting factor is set to one. Otherwise, the weighting factor is set to zero. The numerical constant $\epsilon$ is set to two times the expected noise standard deviation. Mathematically the expression for the calculation of the noise reduced pixel value is given as:

$$q_{mn} = \Sigma_{ij} a_{ij} p_{ij} / \Sigma_{ij} a_{ij}$$

and $$a_{ij}=1 \text{ if } |p_{ij}-p_{mn}| \leq \epsilon$$

$$a_{ij}=1 \text{ if } |p_{ij}-p_{mn}| > \epsilon$$

where $p_{ij}$ represents the $ij^{th}$ pixel contained in the sampled local region, $p_{mn}$ represents the value of the pixel of interest located at row m and column n, $a_{ij}$ represents a weighting factor, and $q_{mn}$ represents the noise reduced pixel value. Typically, a rectangular sampling region centered about the center pixel is used with the indices i and j varied to sample the local pixel values.

The signal dependent noise feature is incorporated into the expression for $\epsilon$ given by the equation:

$$\epsilon = Sfac \sigma_n(p_{mn})$$

where $\sigma_n$ represents the noise standard deviation as given by the noise table evaluated at the center pixel value pmn. The parameter Sfac is termed a scale factor and can be used to vary the degree of noise reduction. The calculation of the noise reduced pixel value $q_{mn}$ as the division of the two sums is then calculated. The process is completed for some or all of the pixels contained in the digital image channel and for some or all the digital image channels contained in the input digital image. The noise reduced pixel values constitute the noise reduced digital image. The modified implementation of the Sigma filter is an example of a noise reduction filter method that uses a noise table.

In a particular embodiment, a spatial sharpening module, which uses noise characteristics, is employed to produce an enhanced digital image. The noise reduced digital image and the noise table are received by the spatial sharpening module, which produces on output an enhanced digital image. Although any spatial sharpening filter that utilizes a priori knowledge of the noise characteristics can be used, currently preferred is a modified implementation of the method disclosed in U.S. Pat. No. 5,081,692 to Kwon et al. This spatial sharpening method performs an unsharp masking operation by filtering the input digital image with a spatial averaging 2-dimensional Gaussian filter (characterized by a standard deviation of 2.0 pixels), which results in a blurred digital image. The blurred digital image is subtracted from the input digital image to form a high-pass residual.

In the Kwon et al. patent, a local variance about a pixel of interest is calculated by using the pixel data from the high-pass residual. Based on the value of the local variance a sharpening factor is adjusted so as to amplify large signals more than small amplitude signals. The amplification factor $\phi$ is therefore a factor of the local variance v, that is, $\phi(v)$. This procedure can be modified to make the amplification factor $\phi(V)$ a function of the estimated noise, that is, $\phi(v,\sigma_n)$. The amplification function $\phi$ is given by a gamma function, or integral of a Gaussian probability function, as given by the equation:

$$\phi(v) = \frac{y_0 + y_{max}\sum e^{-(v-v_0)^2/2s^2}}{y_0 + y_{max}\sum e^{-(v_{max}-v_0)^2/2s^2}}$$

where $y_o$ represents a minimum amplification factor $y_{max}$ represents a maximum amplification factor, $v_{max}$ represents a maximum abscissa value of the variable v, $v_o$ represents a transition parameter and s represents a transition rate parameter. The variable $v_o$ is a function of the noise standard deviation value $\sigma_n$ as per equation:

$$v_0 = Sfac_2 \sigma_n(p_{mn})$$

where the scaling factor $Sfac_2$ determines the sensitivity of the sharpening sensitivity to the noise and the noise standard deviation value $\sigma_n$ is as given by the noise table. The optimal values for the variables depend on the digital imaging application. A particular embodiment uses a value of 1.0 for $y_o$ which results in no spatial sharpening for noisy regions. A value of 3.0 is used for $y_{max}$, however, this variable is sensitive to user preference with values ranging from 2.0 to 4.0 producing acceptable results. The value of $Sfac_2$ should be set to between 1.0 and 2.0 with 1.5 as optimal. The variable s should be set to values in the range from $v_o/2$ to $v_o/10$ for reasonable results. The variable $v_{max}$ should be set to a value much larger than the expected noise, e.g. 20 times the value of $\sigma_n$.

In a particular embodiment, when one or more additional noise-related features are present, the digital image is assigned to one of a plurality of noise categories, each category corresponding to a respective noise-related feature or combination of features and the production of the noise table is also based on the assigned input noise category. Additional dimensions can be added to the noise table or scaling factors can be used to account for other features, which could change noise characteristics. For example, the deposition of clear toner over some parts of a colored toner image may alter noise characteristics in those parts. The additional noise related features can be related to the input digital image or the printing process. The former can either be determined directly from the input digital image or metadata associated with the input digital image. The latter can be manually input or automatically provided by the system.

Noise related features can be estimated directly from an input digital image. U.S. Pat. No. 5,923,775 to Snyder et al. discloses a procedure for the preparation of a noise table based on such noise related features. In the procedure, the input digital image is segmented both according to input pixel code value and smooth vs. textured regions. An estimate of the noise table for the input image is then calculated using statistical means as described above by examining the actual noise characteristics in the smooth regions of the input digital image.

Metadata is information that is additional to the image data and is included in or otherwise associated with the digital image. Metadata can be of a wide variety of different types. Some types of metadata, also referred to herein as "categorizing metadata", can be optionally used in assigning the digital image to one of a plurality of noise categories. Examples of such categorizing metadata and related noise reduction are disclosed in U.S. Pat. No. 7,065,255 to Chen et al., which is hereby incorporated herein by reference.

Categorizing metadata can relate directly or indirectly to image characteristics that affect noise reduction. Examples of such categorizing metadata include: camera model type, image sensor type, type of light source, type of image compression, previous noise reduction processing history, previous spatial sharpening history, and number of image pixels at capture. Categorizing metadata can also relate to usage characteristics that define or suggest user requirements. Examples of such metadata include: customer identification, photographer identification, and job type. Categorizing metadata can be generated at the time or capture of a photograph or other part of a printable frame or can be added at another time. Categorizing metadata can be used to assign the printable frame to one of a plurality of different categories. Each category represents a distinction that is sufficient to allow a change in the noise reduction procedure. The minimum is two categories, for example, one in which noise reduction is applied, and another in which noise reduction is not used. In this example, the metadata could indicate a user preference of no noise reduction or could indicate too low of a resolution to justify use of noise reduction.

Categorizing metadata can be used as scaling factors as disclosed in U.S. Pat. No. 7,065,255. Alternatively, such metadata can be used as dimensions of an applicable noise table. The relative noise magnitude of scaling factors for numerous metadata items can be multiplicatively cascaded into a single noise magnitude scaling factor S. For each piece of metadata, a default relative noise magnitude scaling factor of 1.0 can be set. Therefore, when a given piece of metadata is not available, the corresponding relative noise magnitude scaling factors have no effect on the noise table values. The single noise magnitude scaling factor is then used to modify the noise table produced from other parameters to generate a final noise table that incorporates the dependence of the expected noise magnitude with respect to the variables.

Noise properties can be indicated by categorizing metadata either directly or indirectly. For example, metadata can supply an input noise table that can be used in generating the final noise table. Metadata that indirectly indicates noise properties may require look-up tables to provide the corresponding noise properties.

The noise properties of each digital camera are a function of the various modes in which the digital camera can be operated. For example, the digital camera photographic light sensitivity, as indicated by the metadata ISO (International Standards Organization) speed setting can greatly affect the magnitude of the noise present in the digital images produced with the digital camera. Other operational algorithms within the digital camera can also affect the noise magnitude such as the image compression algorithm, an in-camera noise reduction algorithm, an in-camera spatial sharpening algorithm, and a white balance algorithm. Still other operational modes can also affect the magnitude of the expected noise such as the pixel resolution setting. Each digital camera has a default setting for each operational mode and/or algorithm. Typically, a digital camera is set up for the highest pixel resolution, a mild JPEG compression, daylight source, and an auto white balance algorithm. Some cameras can be set up with different default settings while others can have the ISO speed setting set automatically. That is, by measuring the available light from the original scene image, the digital camera internal logic decides the appropriate ISO speed setting, which then checks for an appropriate shutter speed, and aperture size that will deliver such an ISO speed setting. Other cameras allow users to choose ISO speed setting, with or without auto ISO speed setting available.

Digital cameras intended for professional use tend to have lower noise magnitudes. Noise categories can differentiate individual cameras or can group cameras between consumer and professional models. These approaches can be combined.

For example, noise categories can be based on the ISO speed setting metadata and camera model as indicated by a camera model type metadata recorded along with the source digital image. When an ISO speed setting metadata is not available and the camera model type metadata is available, the lowest ISO speed setting is used to select the noise table. When an ISO speed setting metadata is available and the camera model type metadata is not available, the corresponding ISO speed setting metadata is used to select the noise table based on a predetermined average digital camera. It is also possible that no metadata are available. For this condition the noise table corresponding to the average digital camera can be used as measured for the ISO speed setting of 100. A similar approach can be used with metadata that indicates an image sensor model, since different digital camera models that use the same image sensor model, such as particular CCD or CMOS electronic devices, have very similar noise characteristics.

Some digital cameras can record metadata that indicates that the type of light source that influenced the original scene image was an artificial illuminant light source. Such a light source metadata can be used in assigning a digital image to a noise category. The digital images produced by digital cameras have varying levels of noise present depending on the image compression method used to reduce the size of the image file used to encode the source digital image. In general, the more aggressive the image compression method used, the smaller the image file size and the less noise that will be present in the source digital image. Metadata indicating a compression method or the image file size corresponding to the source digital image can be used in categorizing a digital image.

Many digital cameras have an option that allows the user to select the pixel resolution of the digital images. In general, the magnitude of the noise present in the resulting digital images depends on the pixel resolution of the digital image. This is mainly because the most common algorithm for producing a lower pixel resolution version of the captured pixel data includes an averaging spatial filter. Applying an averaging spatial filter to image pixel data has the effect of reducing the magnitude of the noise present. Resolution of a received digital image can be determined directly. Capture resolution can be determined from camera model metadata or the like. Categorization can be based on this information.

Digital cameras have other features that the user can select that can affect the magnitude of noise in the input digital image. For example, some digital cameras have a digital zoom feature that produces a source digital image with a greater number of pixels than the photo sensor. When this option is selected, the pixels of the resultant source digital image must be interpolated from a digital image that has roughly the same number of pixels as the photo sensor. The interpolated pixels have, in general, less noise per pixel than the pixels from which they are interpolated since the interpolation process usually includes averaging two or more pixels. A category can be based on whether metadata that indicates that the source digital image has resulted from an interpolation process is received.

Some digital cameras apply a noise reduction spatial filter to the pixel data before the source digital image is exported from the digital camera. Metadata that identifies this condition can be received and can be used for categorization. For example, noise reduction can be eliminated or decreased, if prior noise reduction is indicated. The received metadata indicates that prior application of a noise reduction filter has occurred or has not occurred, i.e. previous noise reduction processing history. Some digital cameras apply a noise reduction filter to the pixel data prior generating the digital image that is exported from the camera and do not set metadata indicating this condition. For these cameras, the metadata can be set automatically using the camera model type metadata.

Similarly, some digital cameras apply a sharpening spatial filter to the pixel data before the source digital image is exported from the digital camera. Metadata that identifies this condition can be received and used in categorization. The received metadata indicates a previous spatial sharpening processing history, i.e., whether prior application of a sharpening spatial filter has occurred or has not occurred. Noise reduction can be increased if spatial sharpening has occurred.

System features can be used for categorization of a received digital image in the same manner as metadata. One example of such a system feature is output print size. The original image noise embedded in the image can be amplified and shifted to different frequency bands with different print sizes. The visual noise for one print size will appear different than for other print sizes. Categorization can allow the extent of noise reduction needs to vary with print size. Image resolution of the printed image is another factor influencing digital noise. Different print image resolutions exhibit different information content and different noise levels. Another system feature is the grain parameters of the printing substrate. Grain parameters are features that alter graininess and/or granularity. For example Substrates can differ in the grain parameters of surface finish, for example, glossy, matte, texture, and uncoated, and of paper noise/structure.

The noise reduction occurs as a part of an image processing chain that can include other image manipulations including, but not limited to: standard scene balance algorithms (to determine corrections for density and color balance based on the densities of one or more areas within the negative), tone scale manipulations to amplify film underexposure gamma, non-adaptive or adaptive sharpening via convolution or unsharp masking, red-eye reduction, and non-adaptive or adaptive grain-suppression. Moreover, the image can be artistically manipulated, zoomed, cropped, and combined with additional images or other manipulations known in the art. During the image processing chain the digital image can be electronically transmitted between devices and over networks and can be stored and, if necessary, replicated multiple times. Once the image has been corrected and any additional image processing and manipulation has occurred, the image is ready for printing. Image enhancement functions can be provided in an image enhancement server that includes image enhancement processing modules: color space transformation, image subsampling, scene balance, tone scale adjustment, noise reduction, red eye removal, image smoothing, image sharpening, jpeg deblocking, etc. Each module has internal algorithms designed with a set of global parameters tuned from large image database analysis and a set of local parameters that can be fine adjusted to the incoming input image characteristics. The modules are chained together to process each incoming image in an automated fashion according to the analysis result of the incoming input image characteristics and the desires of customer requests.

The following are examples of individual image enhancement modules, in addition to a noise reduction module. Each image enhancement module is briefly described along with its function according to one of the specific algorithm implementations. The selection of algorithms for each module is not limited to the one described, but can be extended to a variety of algorithms to perform its function.

Color Space Conversion

Images are captured and saved by digital cameras, scanners, and other imaging devices with different color characteristics representing different color spaces. Input image color spaces can be characterized and defined using color profiles as specified by the International Color Consortium (ICC). A color space transformation can be provided that converts all incoming digital images in different color spaces to a common working color space, preferably a color space defined with an expanded bit resolution using 12 to 16 bits per color channel, so that subsequent image enhancement modules can be performed consistently on all images in the common working color space. In a particular embodiment, ICC profiles provided with or embedded in the input images are used in combination with an ICC working color space profile to convert the images into the common working color space. After processing with each of the image enhancement modules, the images are converted back to a standard color space (for example, the sRGB color space) using ICC profiles, and submitted for printing.

Scene Balance

Image scenes are captured at various light conditions. For example, the back-lit scenes where the background is brighter than the subject, and flash-lit scenes where the background is at a much larger distance than the subject and is usually too dim for details. The scene balance algorithm analyzes the distribution of overall exposures and relative color values in the image to determine the appropriate level of exposure and color balance compensation needed. Depending on the analysis of input image characteristics, the level of scene balance compensation can be adjusted. With extreme under exposure images and extreme over exposure images, the more aggressive adjustment level will be applied to compensate the image back to a normal balanced view. An example of a scene balance algorithm is disclosed in U.S. Pat. No. 6,243,133. Professional images, such as graphic designed images are unlikely to benefit from application of a scene balance algorithm and can be excluded from this procedure or otherwise treated differently.

Tone Scale Adjustment

In combination with the scene balance image enhancement module, the contrast of the input image can be adjusted to maintain a proper tone scale. For example, the tone scale can be adjusted to be appropriate at high, medium, and low contrast levels. U.S. Pat. No. 6,813,389 discloses an example of a tone scale adjustment.

Image Subsampling

Processing of digital images having a higher resolution than that of the printed output can slow down processing throughput, without providing any benefit. In general, the same principle applies to a higher resolution image printed with a much lower half-tone screen. For example, a higher than 300 dpi image resolution will not show improved print quality for 150 lpi to 200 lpi screens. Therefore, an image subsampling module will sub-sample image data and scale down sizes to an output resolution. In the previous example, subsampling is to 200 dpi to 300 dpi for higher resolution images.

Image Smoothing/Sharpening

A variety of smoothing and sharpening filters are known to those of skill in the art. A particular sharpening filter is discussed elsewhere herein.

Red-Eye Correction

Red-eye correction can be provided. Examples of red-eye correction procedures are disclosed in U.S. Pat. No. 6,292,574; U.S. Pat. No. 6,895,103; U.S. Pat. No. 7,092,554.

JPEG Deblocking

Digital images have been usually encoded with JPEG standard for transmission and storage purposes. The JPEG standard is implemented with a lossy compression and blocking artifacts can be present in highly compressed images. These blocking artifacts will affect printing quality by presenting a blotchy appearance when the images are scaled up to print. Many procedures are known for reducing JPEG blocking artifacts. Many provide a low-pass smoothing operation to remove discontinuity between block boundaries. This preferably does not smooth out too much of the original image content. It is generally preferred that the JPEG deblocking is performed in its own encoded color space before color transformation to another color space for subsequent processing. A specific example of a JPEG deblocking procedure is disclosed in U.S. Pat. No. 6,823,089.

Bit-Depth Conversion

Some digital cameras capture HDR (high dynamic range) images having larger dynamic range and larger encoded bit-depths than most cameras. In some uses, it may be desirable to convert these types of images for printing on a standard printer. Typically, this requires conversion to an 8-bit image data path. The bit-depth conversion includes tone compression and can be applied with linear or non-linear tone compression curves.

Referring again to FIG. 3, in the method the digital image is divided into color records(Step 315), which are printed after noise reduction(Step 320), using respective toner stations. The noise reduction can occur at different points in the image processing chain. There are advantages if the noise reduction is applied early, before the original noise characteristics of the input mage are modified by other image processing operations. Ideally, noise reduction is applied immediately after color filter array (CFA) interpolation in the digital camera. From the point of view of a printing workflow, this ideal situation may be irrelevant. As a practical matter, in commercial printing, a digital image is generally received in a PDF document, by which time it is likely that the digital image has been subject to image processing including potentially: resampling, color management, and possibly camera applied auto-enhancement balance and tonal algorithms. In this case, noise reduction is preferably applied after decompression and JPEG deblocking or the like, but before any other enhancements. This approach avoids changing the noise characteristics of the received input image. Noise reduction can be performed later in the image processing chain, but intervening image processing tends to inherently change the relationship between input code value and the corresponding noise threshold. This can make production of the noise table more difficult or less accurate. If it is necessary, due to image processing constraints or other factors in the workflow to perform noise reduction relatively late in the image processing chain, for example, after tone scale enhancement, a noise table can be generated based on the input image and can then be modified to account for the effects of other image processing prior to noise reduction. A procedure for this is disclosed in U.S. Pat. No. 6,707,950 to Burns et al.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular and/or plural in referring to the "method" or "methods" and the like is not limiting.

In the following description, some features are described as "software" or "software programs". Those skilled in the art will recognize that the equivalent of such software can also be readily constructed in hardware. Because image manipulation algorithms and systems are well known, the present description emphasizes algorithms and features forming part of, or cooperating more directly with, the method and system. General features of the types of computerized systems discussed herein are well known, and the present description is generally limited to those aspects directly related to the invention. Other aspects of such algorithms and apparatus, and hardware and/or software for producing and otherwise processing the image signals involved therewith, not specifically shown or described herein may be selected from such systems, algorithms, components, and elements known in the art. Given the description as set forth herein, all additional software/hardware implementation is conventional and within the ordinary skill in the art.

It should also be noted that the present invention can be implemented in a combination of software and/or hardware and is not limited to devices, which are physically connected and/or located within the same physical location. One or more of the components illustrated in the figures can be located remotely and can be connected via a network. One or more of the components can be connected wirelessly, such as by a radio-frequency link, either directly or via a network.

It will be understood that the circuits shown and described can be modified in a variety of ways well known to those of skill in the art. It will also be understood that the various features described here in terms of physical circuits can be alternatively provided as firmware or software functions or a combination of the two. Likewise, components illustrated as separate units herein may be conveniently combined or shared. Multiple components can be provided in distributed locations.

In each context, the invention can stand alone or can be a component of a larger system solution. Furthermore, human interfaces, e.g., the scanning or input, the digital processing, the display to a user, the input of user requests or processing instructions (if needed), the output, can each be on the same or different devices and physical locations, and communication between the devices and locations can be via public or private network connections, or media based communication. Where consistent with the disclosure of the present invention, the method of the invention can be fully automatic, can have user input (be fully or partially manual), can have user or operator review to accept/reject the result, or can be assisted by metadata additional to that elsewhere discussed (such metadata that can be user supplied, supplied by a measuring device, or determined by an algorithm). Moreover, the methods may interface with a variety of workflow user interface schemes.

The invention has been described in detail with particular reference to certain preferred embodiments thereof, but it will be understood that variations and modifications can be effected within the spirit and scope of the invention.

The invention claimed is:

1. A printing method for use with a printer having a plurality of toner stations, said method comprising:
receiving a digital image;
constructing a granularity model of each of said toner stations;
producing a noise table adaptive to content of said digital image based on said granularity models;
reducing noise in said digital image using said noise table;
dividing said digital image into a plurality of color records, each said color record corresponding to a respective one of said toner stations; and
printing said color records of said noise reduced digital image using respective said toner stations,
wherein each said granularity model defines a toner applied by the respective said toner station during said printing.

2. The method of claim 1 wherein said reducing is prior to said dividing.

3. The method of claim 2 wherein said dividing further comprises converting said digital image from an input color space to an output color space, said output color space having a number of primaries equal in number to said color records, said input color space having a number of primaries different in number than said color records.

4. The method of claim 1 wherein said noise table is adaptive to interactions between said toners of said printed color records.

5. The method of claim 1 wherein said granularity models each include one or more toner particle size parameters.

6. The method of claim 1 wherein said granularity models each include one or more toner particle shape parameters.

7. The method of claim 1 wherein said granularity models each include one or more toner colorant strength parameters.

8. The method of claim 1 wherein said granularity models of two or more of said toners are different.

9. The method of claim 1 wherein said granularity models of two or more of said toners are the same and respective said noise tables are different.

10. The method of claim 1 further comprising assigning said digital image to one of a plurality of noise categories, wherein said producing is also based on the respective said assigned noise category.

11. The method of claim 10 wherein said digital image has associated metadata and said assigning is based on said metadata.

12. The method of claim 10 wherein said producing is also based on a selected output resolution of said digital image.

13. The method of claim 10 further comprising half-toning said digital image, wherein said producing is also based on a respective frequency of said half-toning.

14. The method of claim 10 further comprising ascertaining a selected one of a plurality of substrates, said selected substrate being printed during said printing, wherein said producing is also based on one or more grain parameters of said selected substrate.

15. A printing method for use with a printer having a plurality of toner stations, said method comprising:
receiving a digital image;
constructing a granularity model of each of said toner stations;
producing a noise table adaptive to content of said digital image based on said granularity models;
reducing noise in said digital image using said noise table;
then dividing said digital image into a plurality of color records, each said color record corresponding to a respective one of said toner stations; and
printing said color records of said noise reduced digital image using respective said toner stations,
wherein each said granularity model defines values of one or more parameters of a toner applied by the respective said toner station during said printing, said parameters including: toner particle size, toner particle shape, and toner colorant strength.

16. The method of claim 15 wherein said reducing is prior to said dividing.

17. The method of claim 16 wherein said dividing further comprises converting said digital image from an input color space to an output color space, said output color space having a number of primaries equal in number to said color records, said input color space having a number of primaries different in number than said color records.

18. The method of claim 17 wherein said granularity models of two or more of said toners are different.

19. The method of claim 17 wherein said granularity models of two or more of said toners are the same and respective said noise tables are different.

20. The method of claim 15 further comprising assigning said digital image to one of a plurality of noise categories, wherein said producing is also based on the respective said assigned noise category.

21. A printing system comprising:
a printer having a plurality of toner stations;
one or more input units supplying a digital image;
an image processing unit including:
- a granularity model engine constructing a granularity model of each of said toner stations, each said granularity model defining a toner applied by the respective said toner station during printing;
- a producer producing a noise table adaptive to content of said digital image based on said granularity models;
- an image processor reducing noise in said digital image using said noise table;
- a partitioner dividing said digital image into a plurality of color records and supplying each said color record of said noise reduced image to a respective one of said toner stations.

* * * * *